F. L. SPRING.
SHOCK ABSORBER.
APPLICATION FILED MAY 20, 1920.
1,429,699.
Patented Sept. 19, 1922.
2 SHEETS—SHEET 2.
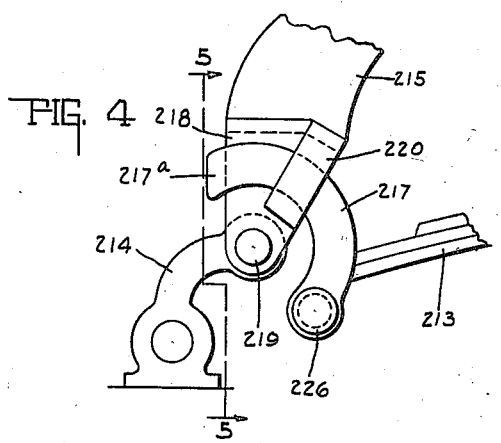
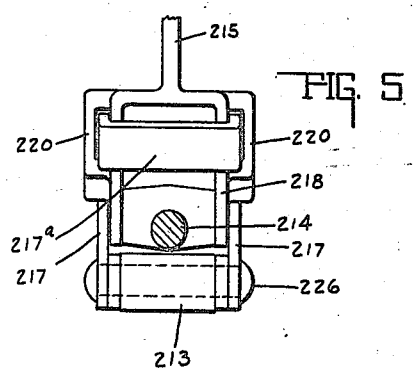
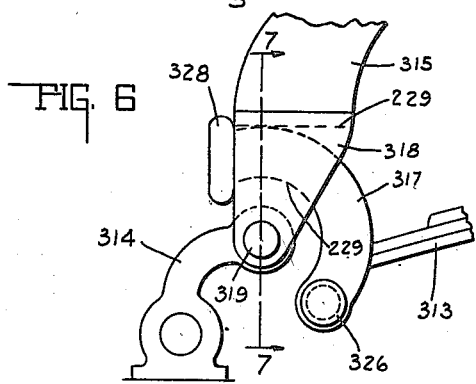
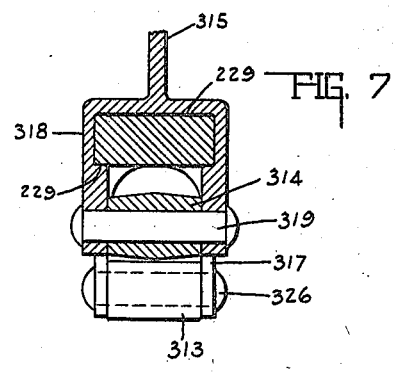
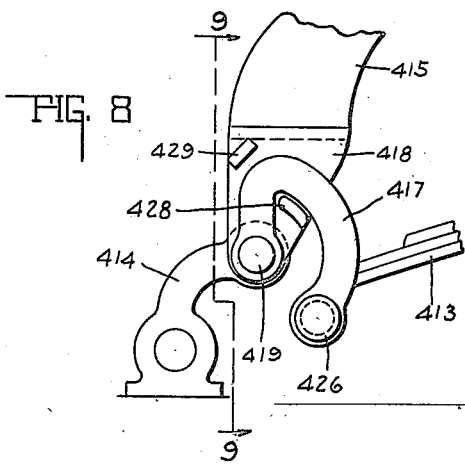
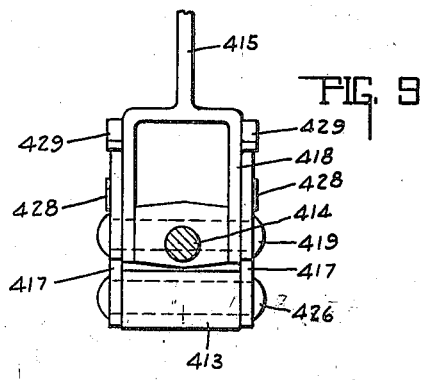
INVENTOR.
FREDERICK L. SPRING.
BY
ATTORNEYS.

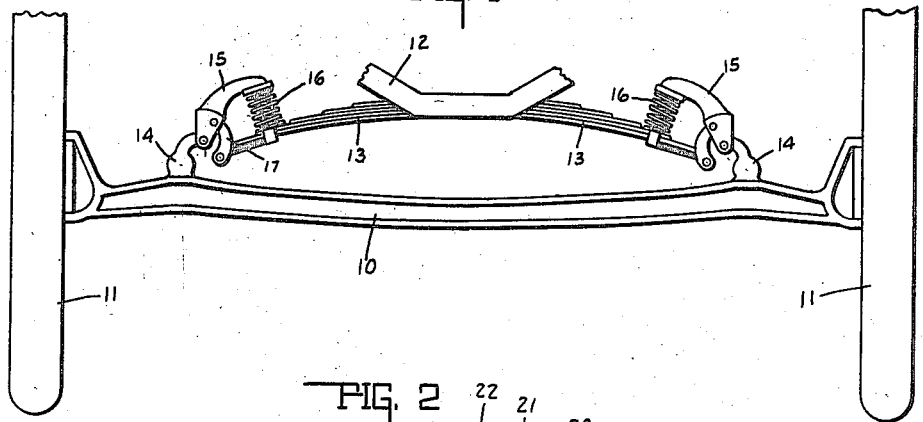
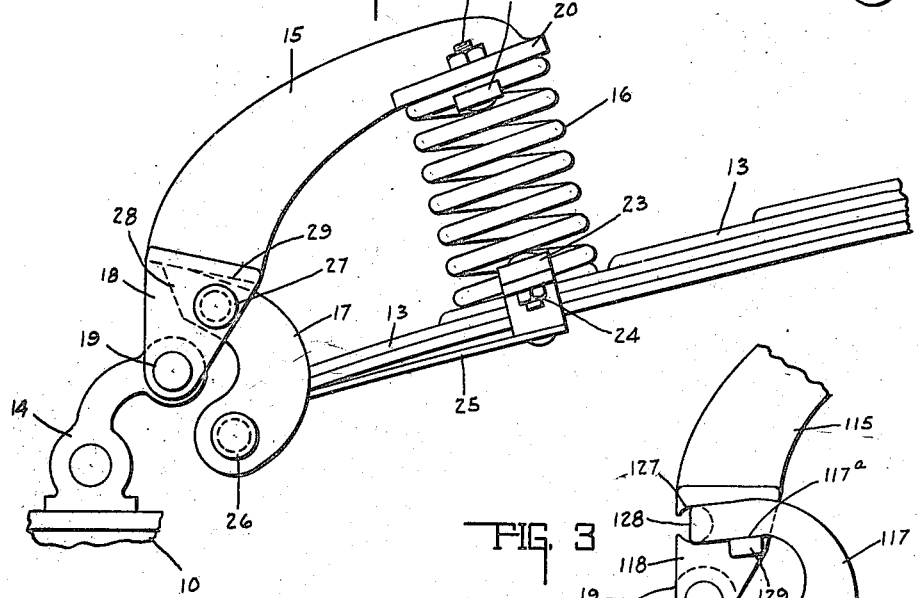
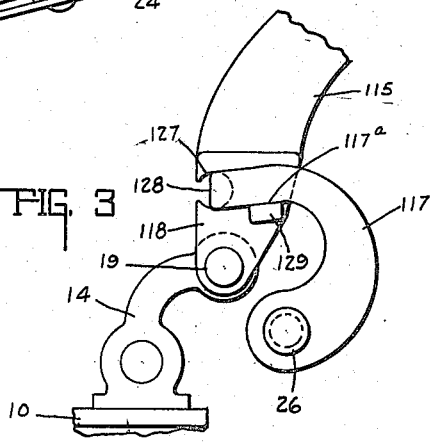

Patented Sept. 19, 1922.

1,429,699

UNITED STATES PATENT OFFICE.

FREDERICK L. SPRING, OF INDIANAPOLIS, INDIANA.

SHOCK ABSORBER.

Application filed May 20, 1920. Serial No. 382,884.

*To all whom it may concern:*

Be it known that I, FREDERICK L. SPRING, a citizen of the United States, and a resident of Indianapolis, county of Marion, and State of Indiana, have invented a certain new and useful Shock Absorber; and I do hereby declare that the following is a full, clear, and exact description thereof, reference being had to the accompanying drawings, in which like numerals refer to like parts.

This invention relates to shock absorbers for vehicles, and in particular to motor vehicles.

The chief object of this invention is to provide a motor vehicle of the Ford or similar type indicated with shock absorbing means, and providing said shock absorbing means with additional means, whereby the original movement of the vehicle supporting means is maintained.

The chief feature of the invention consists in associating with the main spring of the vehicle and the axle, a supporting means mounted on the axle, of a shock absorber construction, including substantially a main lever means pivoted at one end to the supporting means, yielding means between the other end of said main lever means and the main spring, and an auxiliary lever means pivoted to the end of the main spring to form a compound lever construction by being associated with the main lever means such that the two lever means will act as a single rigid lever under the influence of a load on the vehicle, but will act independently of each other on the rebound.

One feature of the invention consists in providing complementary means upon the lever means comprising the compound lever means which cooperate to limit the relative movement of the lever means with respect to each other, whereby the arcuate movement of the vehicle supporting means is maintained.

The full nature of the invention will be understood from the accompanying drawings and the following description and claims.

In the drawings Fig. 1 is a front elevational view of the supporting means of a vehicle provided with shock absorbing means embodying the invention. Fig. 2 is an enlarged side elevational view of the shock absorbing means embodying the feature of the invention. Fig. 3 is a similar view showing a modified form of the invention. Fig. 4 is a similar view showing a modified form of the invention illustrated in Fig. 3. Fig. 5 is a side view thereof taken on line 5—5 of Fig. 4 and in the direction of the arrows. Fig. 6 is a view similar to Figs. 3 and 4 and shows a modified form of the invention illustrated in Figs. 2 and 4. Fig. 7 is a sectional view taken on line 7—7 of Fig. 6. Fig. 8 is a view similar to Figs. 3, 4 and 6 and shows a modified form of the invention. Fig. 9 is a side view thereof taken on line 9—9 of Fig. 8 and in the direction of the arrows.

In the drawings 10 indicates the axle or wheel supporting member, 11 indicating the wheels. 12 indicates the body of the vehicle supported by a semi-elliptical leaf spring 13 intermediate the ends of said spring. Between the ends of the supporting leaf spring 13 and the wheels 11 is an upwardly and inwardly extending supporting member, commonly called the perch 14. The foregoing construction is old in the art and relates particularly to what is known as the Ford type of automobile, said perch in the latest type being formed integral with the axle or wheel supporting member. Heretofore it has been customary to provide shock absorbing means between the end of the leaf spring and the supporting member, known as the perch, said shock absorbing means including a shock absorbing lever 15 and an auxiliary spring member 16, said members being secured in operative relation in several varied forms, said forms including the shackles originally connecting the perch to the end of the leaf spring, or replacing said shackles by other suitable means associated with the shock absorbing means, or by omitting said shackles entirely.

The invention, therefore, consist in a particular arrangement of the main shock absorbing lever 15, the auxiliary spring 16 and the means associated therewith, which in this invention consists of an auxiliary lever member 17. The relationship of the foregoing parts to each other and to the supporting parts of the vehicle hereinbefore mentioned constitutes the invention.

In the usual construction the perch 14 extends upwardly from the axle or wheel supporting member and inwardly towards the center of the vehicle. The main shock absorbing lever 15 in the present invention consists of a curved body portion, the lower end 18 of which is bifurcated and adapted to straddle the perch 14 and be pivotally supported thereon by the pivot pin 19. To the other end of the curved body portion 15 is secured one end of a yielding member, such as the coiled spring 16, the other end of which is secured to the leaf spring intermediate the end and the central body supporting portion thereof. The spring 16 may be secured to the curved lever 15 and the leaf spring 13 by any usual construction. The preferred construction consists of the plate portion 20 formed integral with the lever 15, the clamping bar and bolt and nut means 22. The opposite end of the spring 16 is similarly secured to the leaf spring by the clamping member 23 and the bolt and nut means 24, said securing means extending beneath the leaf spring and parallel to the same at 25 so as to substantially position said coiled spring upon the leaf spring.

In the present invention the shackle construction is replaced by the lever construction 17. The lever 17 is pivotally secured at one end to the end of the leaf spring 13 by suitable pin means 26. The lever 17, in the embodiment illustrated in Figs. 1 and 2, is curved oppositely to the lever 15, and one end thereof projects between the bifurcated portions 18 of said curved lever 15 and is pivotally secured thereto and therein by suitable pin means 27. The lever 17 is provided with an extending projection 28, said projection being engagable upon the surface 29 formed at the junction of the bifurcations and the body portion of said lever. With this construction the projection 28 is seatable in the recess formed between the bifurcated members 18 and the pivotal movement therein of the member 17 is limited by the surface 29 of the lever 15.

In Fig. 3 there is illustrated a modified form of the invention, and instead of the lever 115 being provided with a stop surface 29, said lever is provided with a stop lug 129 at each side thereof and upon the bifurcated portion 118. Each bifurcated arm 118 is provided with a circular opening 127 which is adapted to receive the cross member 128, said cross member being half round in cross section so as to be insertable through the restricted opening of the circular opening 127. The half round portion 128 is formed integral with the curved body portions 117, which in the present instance constitutes the auxiliary lever means, said lever means 117 and the shock absorbing lever 115 being secured to the perch 14 and leaf spring 13, as previously described. The lever means 117 shown in Fig. 3 thus straddles the bifurcated portion of the shock absorbing lever 115 and is pivotally supported thereon.

When the vehicle is loaded, the leaf spring moves downwardly towards the axle and the ends thereof move towards the pockets formed by the upwardly and inwardly extending perch and the axle. When the leaf spring is shackled to the perch, said leaf spring moves into said pocket, and one object of the present invention is to insure that said movement is maintained by providing that the pivot 26 associated with said leaf spring moves when the vehicle is loaded in a path substantially accurate in form and having the pivot 19 as its center to prevent the end of the spring 13 from engaging the axle. The normal loaded condition of the vehicle just suffices to cause the stop member 28 in Fig. 2 to engage the limit surface 29, and in Fig. 3 the arm portions 117$^a$ to engage the stop members 129. Additional loading of the vehicle tilts the main shock absorbing lever about the pivot 19 and moves the pivot 26 as heretofore described, as well as compresses the yielding means or coil spring 16 between said shock absorbing lever and the leaf spring. When a road shock is received by the wheel 11, the same is transmitted through the means hereinbefore described, and part of the same is cushioned or absorbed by the spring 16; while the remainder is taken up by the leaf spring 13. In rebounding, the upward movement of the leaf spring 13 is transmitted through the spring 16 to the outer end of the lever 15. Said upward movement is limited by the spring 16, which acts as a tension member in this instance. In the reverse movement, the downward movement of the lever 15 is limited by the stop means hereinbefore described, and the remainder of said movement is absorbed by the spring 16, which in this instance acts as a compression member. With this construction the oscillatory movement of the pin 26 about the center 19 is retained and maintained with the foregoing shock absorbing means added thereto.

Reference will now be had to Fig. 1 wherein the prevention of side swaying is eliminated. Assume that the vehicle is rapidly turning a corner. Then the body 12 (due to centrifugal force) attempts to move to the left, the wheels 11, with the axle 10 and perches 14 being held on the roadway remain in position. Thus, the left hand lever 17 moves the left hand lever 15 downwardly to compress the left hand coil spring 16. The right hand leaf spring portion 13 moves to the left and carries with it the right hand lever 17, and the lower end of the right hand coil spring 16. The upper end of the right coil spring 16, through the right hand lever 15, resists said sideway movement and acts as a tension member. Thus, under side sway the opposite coil springs 16 act respectively as compression and tension members to absorb or resist the side sway of the body.

To further understand the action of the shock absorbers under rebound, assume that the wheels 11 and axle 10 are stationary while the body 12 is moved straight upwardly. The leaf spring 13 moves upwardly and the ends also move inwardly. This upward and inward movement of the leaf spring ends moves both of the main levers 15 upwardly and outwardly on their perch pivots. The auxiliary levers 17, however, with the base of the shock absorbing spring 16 move inwardly and upwardly so that the springs 16 act as tension members in the rebound of the car body and thus absorb the rebound shock. The greater the rebound therefore the greater will be the resistance of the tension members, since the greater will be the upward and outward movement of the main levers 15 and, therefore, the greater will be the stressing or tensioning upon the spring 16, both ends of which are secured respectively to the leaf spring and to the outer free end of the lever 15. Similarly under load the springs 16 are compressed, as well as the spring 13, the latter being straightened out and the levers 15 and 17 moving about the perch pivot as a unit until the spring 13 with the spring 16 absorbs the load shock.

In Figs. 4 and 5 a modified form of the invention is illustrated wherein the perch is indicated by the numeral 214, the main shock absorbing lever 215, the leaf spring 213 and the pivotal support of the shock absorbing member upon the perch by the numeral 219, and the pivotal support of the auxiliary lever 217 upon the leaf spring 213 by the numeral 226. In this modification of the invention the lever 217 is substantially arcuate in form and consists of a substantially U-shaped body portion in which 217ª indicates the connecting strap portion, which acts as a stop to limit the movement of said U-shaped auxiliary lever 217 upon the bifurcated portion 218 of the main shock absorbing lever 215. The U-shaped auxiliary lever 217 is supported upon the bifurcated portion 218 of the main shock absorbing lever by the strap portions 220 which project outwardly from said bifurcated portions, as shown clearly in Fig. 5.

In Fig. 6 the similar parts are designated by appropriate numerals. In this modification the auxiliary lever 317 is also substantially arcuate in form, but instead of being U-shaped as illustrated in Figs. 3, 4 and 5, said lever comprises a single pin member somewhat similar to the lever 17 shown in Fig. 2. In this embodiment of the invention each bifurcated portion 318 of the main shock absorbing lever 315 is provided with a channel 229. The auxiliary lever 317 is provided with a stop member 328, one end of which limits the movement of said auxiliary lever upon the main lever 315. The other end of the auxiliary lever 317 is bifurcated, as shown in Fig. 7, and is secured to the leaf spring 313 at 326 in the usual manner.

In Figs. 8 and 9 is illustrated another embodiment of the invention, in this instance instead of a U-shaped auxiliary lever or an auxiliary lever provided with a bifurcated portion and a stop portion, the auxiliary lever means consists of two similar, curved levers 417, one end of which is pivotally secured to the leaf spring 413 in the usual manner at 426. In this instance the other end of the auxiliary levers 417 is pivotally supported upon the perch 414 at 419. The main shock absorbing lever 415 provided with the bifurcated portions 418 is also pivoted at 419 to the perch 414. Stop means are positioned upon the bifurcated portions 418 and project outwardly therefrom into association with the similar levers 417. The stop means 428 limits the downward movement of the lever 417, and the stop means 429 limits the upward movement of said lever upon the main shock absorbing lever 415.

In each of the embodiments of the invention illustrated in Figs. 2, 3, 4, 6 and 8 and the other views associated therewith, the main shock absorbing lever is pivoted to the perch, and the auxiliary lever means is pivoted at one end to the main leaf spring, the lever being limited in movement with respect to the main shock absorbing lever by suitable means associated with both of said levers, whereby arcuate movements of the auxiliary lever and its pivotal connection with the leaf spring about the perch pivot is secured.

The invention claimed is:

1. A shock absorbing construction for two relatively movable members of a vehicle separated by spring means, including pivotally supported main lever means connected to one of said members, yielding means between said lever means and said separating spring means, and auxiliary lever means pivotally connected to the separating spring means, and operatively associated with said main lever means so that the two lever means will act together as a single lever construction under the influence of the load of the vehicle and will act independently of each other on the rebound.

2. A shock absorbing construction for two relatively movable members of a vehicle separated by spring means, including a compound lever means having a plurality of levers which co-act as one lever under the influence of a load and act independently on rebound, said compound lever means being fulcrumed between its ends and pivotally supported by the separating spring means, and yielding means between the separating spring means and said compound lever means.

3. A shock absorbing construction for two relatively movable members of a vehicle separated by spring means including lever means pivoted to one of said members, yielding shock absorbing means between said lever means and said separating spring means, auxiliary lever means pivotally connected to said separating spring means, and supported upon said first mentioned lever means, and stop means associated with both of said lever means for limiting the relative movement of said lever means to each other.

4. A shock absorbing construction for two relatively movable members of a vehicle separated by spring means including lever means pivotally supported at one end and connected to one of said members, yielding means between said lever means and said separated spring means, auxiliary lever means pivotally connected to said separating spring means and pivotally supported upon said first mentioned lever means, the pivotal support of the auxiliary lever means upon said separating spring means being movable arcuately about said first mentioned lever means pivotal support, and stop means for limiting the relative movement of said lever means to each other.

5. A shock absorbing construction for two relatively movable members separated by spring means, including lever means pivotally supported at one end and connected to one of said members and extending towards said separating spring means, yielding means between said lever means and said separating spring means and secured to the other end of said lever means and to said separating spring means, auxiliary lever means pivotally connected at one end to said separating spring means and supported upon said first mentioned lever means intermediate the ends thereof, and stop means associated with both of said lever means for limiting the relative movement of said lever means to each other.

6. A shock absorbing construction for two relatively movable members separated by spring means including a lever pivotally supported and extending towards said separating spring means, said lever being bifurcated adjacent said pivotal support, yielding shock absorbing means between said lever and said separating spring means, auxiliary lever means pivoted at one end upon said separating spring means, and the other end supported adjacent the bifurcated portion of said lever, the auxiliary lever means and the first mentioned lever being movable one within the other, and stop means limiting the relative movement of said lever and said lever means to each other.

7. A shock absorbing construction for two relatively movable members separated by spring means, including a lever pivotally supported at one end and curved so as to extend towards said separating spring means, yielding shock absorbing means between said lever and said separating spring means, auxiliary lever means similarly curved and pivotally connected to said separating spring means and extending towards said shock absorbing lever and supported thereby intermediate the pivoted support of said shock absorbing lever and the yielding shock absorbing means connection with said lever, and stop means associated with both of said lever means for limiting the relative movement of said lever means to each other.

8. A shock absorbing construction for two relatively movable members including curved lever means pivotally supported at one end, yielding shock absorbing means between said lever means and said separating spring means, curved auxiliary lever means pivotally connected to said separating spring means and extending towards said first mentioned lever means, and stop means associated with both of said lever means for limiting the relative movement of said lever means to each other to secure arcuate movement of the separating spring means auxiliary lever means support about the first mentioned lever means pivotal support.

9. A shock absorbing construction for two relatively movable members separated by leaf spring means, including a lever pivotally supported upon one of said members, and an auxiliary lever supported on said first mentioned lever and connected to the end of the leaf spring, a spring between said leaf spring and the first mentioned lever, and means limiting the movement of said second mentioned spring towards the end of the leaf spring.

10. A shock absorbing construction for two relatively movable members separated by leaf spring means, including a lever pivotally supported upon one of said members, and an auxiliary lever supported on said first mentioned lever and connected to the end of the leaf spring, and a spring between said leaf spring and the first mentioned lever and secured to the free end of the latter and rigidly secured to the leaf spring.

In witness whereof, I have hereunto affixed my signature.

FREDERICK L. SPRING.